(12) United States Patent
Watanabe et al.

(10) Patent No.: US 9,034,267 B2
(45) Date of Patent: *May 19, 2015

(54) EXHAUST PURIFICATION SYSTEM OF INTERNAL COMBUSTION ENGINE

(75) Inventors: Masao Watanabe, Susono (JP); Koutarou Hayashi, Mishima (JP); Kohei Yoshida, Gotemba (JP); Yuki Bisaiji, Mishima (JP); Kazuhiro Umemoto, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/260,986

(22) PCT Filed: Oct. 4, 2010

(86) PCT No.: PCT/JP2010/067705
§ 371 (c)(1),
(2), (4) Date: Sep. 29, 2011

(87) PCT Pub. No.: WO2012/046332
PCT Pub. Date: Apr. 12, 2012

(65) Prior Publication Data
US 2013/0183203 A1    Jul. 18, 2013

(51) Int. Cl.
*B01D 53/00* (2006.01)
*B01D 53/94* (2006.01)
(Continued)

(52) U.S. Cl.
CPC ........ *B01D 53/9431* (2013.01); *B01D 53/9422* (2013.01); *B01D 2255/1021* (2013.01); *B01D 2255/1025* (2013.01); *B01D 2255/20715* (2013.01); *B01D 2255/2092* (2013.01);
(Continued)

(58) Field of Classification Search
None
See application file for complete search history.

(56) References Cited

U.S. PATENT DOCUMENTS 5,052,178 A    10/1991    Clerc et al.
5,057,483 A *  10/1991    Wan .............................. 502/304
(Continued)

FOREIGN PATENT DOCUMENTS

CN    101454081 A    6/2009
CN    101600860 A    12/2009
(Continued)

OTHER PUBLICATIONS

Office Action dated Oct. 23, 2013 issued in U.S. Appl. No. 13/263,272.
(Continued)

*Primary Examiner* — Walter D Griffin
*Assistant Examiner* — Jelitza Perez
(74) *Attorney, Agent, or Firm* — Oliff PLC

(57) ABSTRACT

In an internal combustion engine, inside of an engine exhaust passage, a hydrocarbon feed valve (15) and an exhaust purification catalyst (13) are arranged. The exhaust purification catalyst (13) is comprised of a mixture of a first catalyst in which platinum (51) and a basic layer (52) are carried on alumina (50) and a second catalyst in which rhodium (56) is carried on zirconia (55). The concentration of hydrocarbons which flow into the exhaust purification catalyst (13) is made to vibrate by within a predetermined range of amplitude of a 200 ppm or more and within a predetermined range of period of 5 second or less, whereby the $NO_x$ which is contained in exhaust gas is reduced at the exhaust purification catalyst (13).

7 Claims, 12 Drawing Sheets

(51) Int. Cl.
*F01N 3/08* (2006.01)
*B01J 35/00* (2006.01)
*B01J 23/42* (2006.01)
*B01J 23/46* (2006.01)
*B01J 23/58* (2006.01)
*B01J 23/63* (2006.01)
*F01N 3/36* (2006.01)
*B01J 35/04* (2006.01)

(52) U.S. Cl.
CPC .......... *B01D2255/91* (2013.01); *F01N 3/0814* (2013.01); *F01N 3/0871* (2013.01); *F01N 2240/30* (2013.01); *F01N 2610/03* (2013.01); *B01J 35/0006* (2013.01); *B01J 23/42* (2013.01); *B01J 23/464* (2013.01); *B01J 23/58* (2013.01); *B01J 23/63* (2013.01); *F01N 3/0842* (2013.01); *F01N 3/36* (2013.01); *B01J 35/04* (2013.01)

(56) References Cited

U.S. PATENT DOCUMENTS

| | | | |
|---|---|---|---|
| 5,075,274 | A | 12/1991 | Kiyohide et al. |
| 5,402,641 | A | 4/1995 | Katoh et al. |
| 5,882,607 | A | 3/1999 | Miyadera et al. |
| 6,109,024 | A | 8/2000 | Kinugasa et al. |
| 6,327,851 | B1 | 12/2001 | Bouchez et al. |
| 6,413,483 | B1 | 7/2002 | Brisley et al. |
| 6,477,834 | B1 | 11/2002 | Asanuma et al. |
| 6,667,018 | B2 | 12/2003 | Noda et al. |
| 6,813,882 | B2 | 11/2004 | Hepburn et al. |
| 6,854,264 | B2 | 2/2005 | Elwart et al. |
| 6,877,311 | B2 | 4/2005 | Uchida |
| 6,983,589 | B2 | 1/2006 | Lewis, Jr. et al. |
| 7,063,642 | B1 | 6/2006 | Hu et al. |
| 7,073,325 | B2 | 7/2006 | Nakatani et al. |
| 7,082,753 | B2 | 8/2006 | Dalla Betta et al. |
| 7,111,456 | B2 | 9/2006 | Yoshida et al. |
| 7,137,379 | B2 | 11/2006 | Sasaki et al. |
| 7,146,800 | B2 | 12/2006 | Toshioka et al. |
| 7,165,393 | B2 | 1/2007 | Betta et al. |
| 7,299,625 | B2 | 11/2007 | Uchida et al. |
| 7,332,135 | B2 * | 2/2008 | Gandhi et al. ............ 422/177 |
| 7,412,823 | B2 | 8/2008 | Reuter et al. |
| 7,454,900 | B2 | 11/2008 | Hayashi |
| 7,484,504 | B2 | 2/2009 | Kato et al. |
| 7,506,502 | B2 | 3/2009 | Nakano et al. |
| 7,549,284 | B2 | 6/2009 | Iihoshi et al. |
| 7,703,275 | B2 | 4/2010 | Asanuma et al. |
| 7,707,821 | B1 | 5/2010 | Legare |
| 7,861,516 | B2 | 1/2011 | Allansson et al. |
| 8,099,950 | B2 | 1/2012 | Kojima et al. |
| 8,215,101 | B2 | 7/2012 | Tsujimoto et al. |
| 8,261,532 | B2 | 9/2012 | Fukuda et al. |
| 8,281,569 | B2 | 10/2012 | Handa et al. |
| 8,434,296 | B2 | 5/2013 | Wada et al. |
| 8,572,950 | B2 | 11/2013 | Bisaiji et al. |
| 8,656,706 | B2 | 2/2014 | Umemoto et al. |
| 8,671,667 | B2 | 3/2014 | Bisaiji et al. |
| 8,679,410 | B2 | 3/2014 | Umemoto et al. |
| 8,689,543 | B2 | 4/2014 | Numata et al. |
| 8,695,325 | B2 | 4/2014 | Bisaiji et al. |
| 2001/0052232 | A1 | 12/2001 | Hoffmann et al. |
| 2002/0029564 | A1 | 3/2002 | Roth et al. |
| 2003/0010020 | A1 | 1/2003 | Taga et al. |
| 2003/0040432 | A1 | 2/2003 | Beall et al. |
| 2003/0101713 | A1 | 6/2003 | Dalla Betta et al. |
| 2004/0045285 | A1 | 3/2004 | Penetrante et al. |
| 2004/0050037 | A1 | 3/2004 | Betta et al. |
| 2004/0055285 | A1 | 3/2004 | Rohr et al. |
| 2004/0154288 | A1 | 8/2004 | Okada et al. |
| 2004/0175305 | A1 | 9/2004 | Nakanishi et al. |
| 2004/0187477 | A1 | 9/2004 | Okugawa et al. |
| 2005/0135977 | A1 | 6/2005 | Park et al. |
| 2005/0147541 | A1 | 7/2005 | Ajisaka et al. |
| 2006/0053778 | A1 | 3/2006 | Asanuma et al. |
| 2006/0107657 | A1 | 5/2006 | Bernler et al. |
| 2006/0153761 | A1 | 7/2006 | Bandl-Konrad et al. |
| 2006/0286012 | A1 | 12/2006 | Socha et al. |
| 2007/0016357 | A1 | 1/2007 | Nakagawa et al. |
| 2007/0028601 | A1 | 2/2007 | Duvinage et al. |
| 2007/0059223 | A1 | 3/2007 | Golunski et al. |
| 2007/0089403 | A1 | 4/2007 | Pfeifer et al. |
| 2007/0125073 | A1 | 6/2007 | Reuter |
| 2007/0151232 | A1 | 7/2007 | Dalla Betta et al. |
| 2008/0022662 | A1 | 1/2008 | Yan |
| 2008/0053073 | A1 | 3/2008 | Kalyanaraman et al. |
| 2008/0102010 | A1 | 5/2008 | Bruck et al. |
| 2008/0120963 | A1 | 5/2008 | Morita et al. |
| 2008/0148711 | A1 | 6/2008 | Takubo |
| 2008/0154476 | A1 | 6/2008 | Takubo |
| 2008/0196398 | A1 | 8/2008 | Yan |
| 2008/0223020 | A1 | 9/2008 | Yoshida et al. |
| 2008/0276602 | A1 | 11/2008 | McCabe et al. |
| 2009/0000277 | A1 | 1/2009 | Yoshida et al. |
| 2009/0049824 | A1 | 2/2009 | Kojima et al. |
| 2009/0049825 | A1 | 2/2009 | Ohashi |
| 2009/0049826 | A1 | 2/2009 | Toshioka et al. |
| 2009/0077948 | A1 | 3/2009 | Mondori et al. |
| 2009/0084091 | A1 | 4/2009 | Tsujimoto et al. |
| 2009/0118121 | A1 | 5/2009 | Sarai |
| 2009/0120072 | A1 | 5/2009 | Dalla Betta et al. |
| 2009/0151332 | A1 | 6/2009 | Toshioka et al. |
| 2009/0191108 | A1 | 7/2009 | Blanchard et al. |
| 2009/0196811 | A1 | 8/2009 | Yamashita et al. |
| 2009/0229251 | A1 | 9/2009 | Kadowaki |
| 2009/0249768 | A1 | 10/2009 | Asanuma et al. |
| 2009/0266057 | A1 | 10/2009 | Tsujimoto et al. |
| 2009/0282809 | A1 | 11/2009 | Toshioka |
| 2009/0288393 | A1 | 11/2009 | Matsuno et al. |
| 2009/0313970 | A1 | 12/2009 | Iida |
| 2010/0005873 | A1 | 1/2010 | Katoh et al. |
| 2010/0055012 | A1 | 3/2010 | Grisstede et al. |
| 2010/0107613 | A1 | 5/2010 | Masuda et al. |
| 2010/0115923 | A1 | 5/2010 | Tsujimoto et al. |
| 2010/0126148 | A1 | 5/2010 | Morishima et al. |
| 2010/0132356 | A1 | 6/2010 | Lee |
| 2010/0154387 | A1 | 6/2010 | Shibata et al. |
| 2010/0233051 | A1 | 9/2010 | Grisstede et al. |
| 2010/0236224 | A1 | 9/2010 | Kumar et al. |
| 2010/0242459 | A1 | 9/2010 | Tsujimoto et al. |
| 2011/0041486 | A1 | 2/2011 | Kato et al. |
| 2011/0047984 | A1 | 3/2011 | Lee et al. |
| 2011/0047988 | A1 | 3/2011 | Lewis et al. |
| 2011/0113754 | A1 | 5/2011 | Kohara et al. |
| 2011/0120100 | A1 | 5/2011 | Yin et al. |
| 2011/0131952 | A1 | 6/2011 | Onodera et al. |
| 2011/0173950 | A1 | 7/2011 | Wan et al. |
| 2011/0209459 | A1 | 9/2011 | Hancu et al. |
| 2012/0122660 | A1 | 5/2012 | Andersen et al. |
| 2012/0124967 | A1 | 5/2012 | Yang et al. |
| 2012/0124971 | A1 | 5/2012 | Bisaiji et al. |
| 2012/0131908 | A1 | 5/2012 | Bisaiji et al. |
| 2013/0000284 | A1 | 1/2013 | Bisaiji et al. |
| 2013/0011302 | A1 | 1/2013 | Bisaiji et al. |
| 2013/0022512 | A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-4-200637 | 7/1992 |

(56) References Cited

FOREIGN PATENT DOCUMENTS

| | | |
|---|---|---|
| JP | A-H08-117601 | 5/1996 |
| JP | A-09-004437 | 1/1997 |
| JP | A-H09-220440 | 8/1997 |
| JP | A-11-30117 | 2/1999 |
| JP | A-11-62559 | 3/1999 |
| JP | A-11-081994 | 3/1999 |
| JP | A-2000-257419 | 9/2000 |
| JP | A-2002-188429 | 7/2002 |
| JP | A-2004-16850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-061340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 A1 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 A1 | 9/2011 |
| WO | WO 2011/114501 A1 | 9/2011 |
| WO | WO 2011/118044 A1 | 9/2011 |

OTHER PUBLICATIONS

Oct. 26, 2010 International Search Report issued in International Patent Application No. PCT/JP2010/063135.
Jan. 18, 2011 International Search Report issued in International Patent Application No. PCT/JP2010/068785.
Jan. 18, 2011 International Search Report issued in International Patent Application No. PCT/JP2010/067707.
Dec. 21, 2010 Search Report issued in International Patent Application No. PCT/JP2010/065449 (with translation).
U.S. Appl. No. 13/257,789 in the name of Nishioka et al. filed Oct. 14, 2011.
U.S. Appl. No. 13/263,272 in the name of Bisalji et al. filed Oct. 6, 2011.
U.S. Appl. No. 13/264,062 in the name of Watanabe et al. filed Oct. 12, 2011.
U.S. Appl. No. 13/259,885 in the name of Umemoto et al. filed Sep. 23, 2011.
Office Action dated May 7, 2014 issued in U.S. Appl. No. 13/264,062.
Corrected Notice of Allowability dated Feb. 6, 2014 issued in U.S. Appl. No. 13/202,694.
Written Opinion for PCT Application No. PCT/JP2010/065186 mailed Nov. 22, 2010, dated Nov. 12, 2010.
International Search Report for PCT Application No. PCT/JP2010/065186 mailed Nov. 22, 2010 (with translation).
International Search Report dated Jun. 15, 2010 issued in PCT/JP2010/054730 (with translation).
Mar. 15, 2011 International Search Report issued in International Application No. PCT/JP2011/053429.
Nov. 22, 2010 International Search Report issued in International Patent Application No. PCT/JP2010/065187.
Nov. 26, 2012 Office Action issued in U.S. Appl. No. 13/202,694.
U.S. Appl. No. 13/264,230 in the name of Bisaiji et al. filed Oct. 13, 2011.
U.S. Appl. No. 13/262,858 in the name of Bisaiji et al. filed Oct. 4, 2011.
May 15, 2013 Office Action in U.S. Appl. No. 13/202,694.
U.S. Appl. No. 13/202,733 in the name of Bisaiji et al. filed Sep. 30, 2011.
Notice of Allowance dated Oct. 17, 2013 issued in U.S. Appl. No. 13/202,694.
Office Action dated Dec. 20, 2013 issued in U.S. Appl. No. 13/264,230.
Oct. 26, 2012 Office Action issued in U.S. Appl. No. 13/202,692.
U.S. Appl. No. 13/202,692 in the name of Umemoto et al. filed Sep. 20, 2011.
Notice of Allowance dated Nov. 13, 2013 issued in U.S. Appl. No. 13/202,692.
Office Action dated Jul. 24, 2013 issued in U.S. Appl. No. 13/202,692.
Notice of Allowance dated Mar. 4, 2014 issued in U.S. Appl. No. 13/255,786.
Office Action dated Jun. 23, 2014 issued in U.S. Appl. No. 13/262,858.
Office Action dated May 8, 2014 issued in U.S. Appl. No. 13/375,674.
Office Action dated May 2, 2014 issued in U.S. Appl. No. 13/263,660.
Jun. 19, 2014 Office Action issued in U.S. Appl. No. 13/264,594.
U.S. Appl. No. 13/582,862, filed Sep. 5, 2012 in the name of Uenishi et al.
U.S. Appl. No. 13/264,594, filed Oct. 14, 2011 in the name of Inoue et al.
U.S. Appl. No. 13/375,674, filed Dec. 1, 2011 in the name of Inoue et al.
Notice of Allowance dated Mar. 28, 2014 issued in U.S. Appl. No. 13/582,862.
Mar. 8, 2011 International Search Report is in International Application No. PCT/JP2011/052969 (with translation).
U.S. Appl. No. 13/263,660 in the name of Umemoto et al filed Oct. 7, 2011.
International Search Report issued in International Patent Application No. PCT/JP2011/075618 dated Dec. 27, 2011.
Written Opinion issued in International Patent Application No. PCT/JP2011/075618 dated Dec. 27, 2011.
U.S. Appl. No. 13/580,000 in the name of Bisaiji et al. filed Aug. 20, 2012.
Mar. 22, 2011 International Search Report issued in International Patent Application No. PCT/JP2010/072299.

(56) References Cited

OTHER PUBLICATIONS

International Search Report dated Jun. 29, 2010 in International Application No. PCT/JP2010/055303.
U.S. Appl. No. 13/259,574 in the name of Tsukamoto et al. filed Sep. 23, 2011.
U.S. Appl. No. 13/264,884 in the name of Bisaiji et al. filed Oct. 17, 2011.
U.S. Appl. No. 13/258,483 in the name of Numata et al, filed Sep. 22, 2011.
U.S. Appl. No. 13/202,694 in the name of Bisaiji et al. filed Aug. 22, 2011.
Office Action dated Jul. 1, 2014 in U.S. Appl. No. 13/257,789.
Office Action dated Jun. 26, 2014 issued in U.S. Appl. No. 13/580,000.
Office Action dated Apr. 3, 2014 issued in U.S. Appl. No. 13/259,574.
U.S. Appl. No. 13/582,909 in the name of Kazuhiro Umemoto et al. filed Sep. 5, 2012.
U.S. Appl. No. 13/578,148 in the name of Kazuhiro Umemoto et al. filed Aug. 9, 2012.
Jun. 18, 2014 Office Action issued in U.S. Appl. No. 13/582,909.
U.S. Appl. No. 13/581,186 in the name of Umemoto et al. filed Aug. 24, 2012.
Jun. 16, 2014 Office Action issued in U.S. Appl. No. 13/581,186.
Jul. 14, 2014 Office Action issued in U.S. Appl. No. 13/262,001.
U.S. Appl. No. 13/262,001 in the name of Inoue et al. filed Jan. 9, 2014.
U.S. Appl. No. 14/152,629 in the name of Umemoto filed Jan. 10, 2014.
U.S. Appl. No. 14/108,113 in the name of Bisaiji filed Dec. 16, 2013.
Jul. 14, 2014 Office Action issued in U.S. Appl. No. 13/264,884.
Jun. 21, 2011 International Search Report issued in International Patent Application No. PCT/JP2011/059880.
Mar. 22, 2011 International Search Report issued in International Patent Application No. PCT/JP2010/073645.
May 17, 2011 International Search Report issued in International Patent Application No. PCT/JP2011/057264.
Aug. 6, 2014 Notice of Allowance issued in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Aug. 13, 2013 International Preliminary Report on Patentability issued in International Patent Application No. PCT/JP2011/053429.
Aug. 8, 2013 Office Action issued in U.S. Appl. No. 13/258,483.
Dec. 21, 2010 Search Report issued in International Patent Application No. PCT/JP2010/065449.
International Search Report issued in International Patent Application No. PCT/JP2010/067705 dated Jan. 18, 2011.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International Search Report issued in International Patent Application No. PCT/JP2010/054729.
Sep. 13, 2011 International Search Report issued in International Patent Application No, PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et at, filed Jul. 2, 2013.
U.S. Appl. No. 13/262,506 in the name of Bisaiji et al., filed Sep. 30, 2011.
Dec. 22, 2014 Office Action issued in U.S. Appl. No. 13/264,230.

* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine in which an exhaust purification catalyst for reacting $NO_x$ contained in exhaust gas and reformed hydrocarbons is arranged inside of an engine exhaust passage, the exhaust purification catalyst is comprised of a mixture of a first catalyst in which platinum and a basic layer are carried on a carrier and a second catalyst in which rhodium is carried on zirconia, the exhaust purification catalyst has a property of reducing the $NO_x$ which is contained in exhaust gas if a concentration of hydrocarbons flowing into the exhaust purification catalyst is made to vibrate within a predetermined range of amplitude and within a predetermined range of period and has a property of being increased in storage amount of $NO_x$ which is contained in exhaust gas if the vibration period of the hydrocarbon concentration is made longer than the predetermined range, and, at the time of engine operation, the concentration of hydrocarbons flowing into the exhaust purification catalyst is made to vibrate within the predetermined range of amplitude and within the predetermined range of period to thereby reduce $NO_x$ which is contained in exhaust gas in the exhaust purification catalyst.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
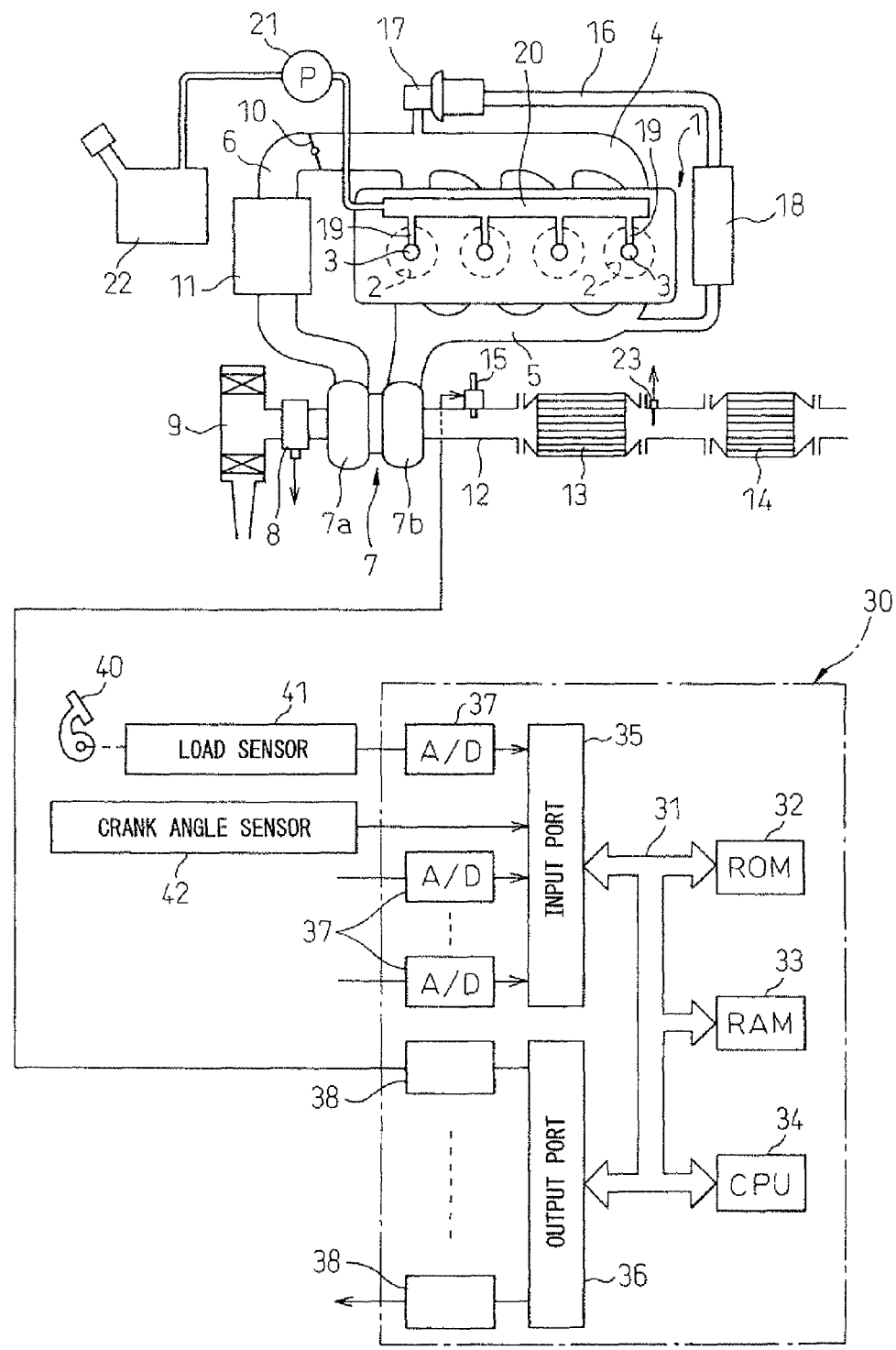
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while an outlet of the exhaust purification catalyst 13 is connected to a particulate filter 14 for trapping particulate which is contained in exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 for detecting an exhaust gas temperature is attached. The output signals of this temperature sensor 23 and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2A:
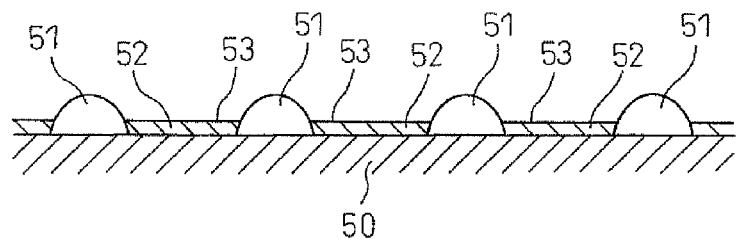
FIGS. 2A and 2B are views schematically showing the surface part of a catalyst carrier.

The substrate of the exhaust purification catalyst 13 is, for example, comprised of cordierite. On the surface of this substrate, a coat layer comprised of a mixture of a powder-shaped first catalyst and a powder-shaped second catalyst is formed. FIG. 2A schematically shows a surface part of the catalyst carrier of this first catalyst, while FIG. 2B schematically shows a surface part of the catalyst carrier of this second catalyst.

The catalyst carrier 50 of the first catalyst shown in FIG. 2A is formed from alumina $Al_2O_3$. On the catalyst carrier 50 comprised of this alumina, platinum Pt 51 and a basic layer 52 including at least one element selected from potassium K, sodium Na, cesium Cs, or another such alkali metal, barium Ba, calcium Ca, or another such alkali earth metal, a lanthanoid or other such rare earth, and silver Ag, copper Cu, iron Fe, iridium Ir, or other such metal which can donate electrons to $NO_x$ are carried. In FIG. 2A, 53 shows the surface part of the basic layer 52. The surface part 53 of this basic layer 52 exhibits basicity.

Note that, regarding the first catalyst, on the catalyst carrier 50, in addition to platinum Pt 51, palladium Pd may also be carried. Further, as the catalyst carrier 50 of the first catalyst, as explained above, alumina $Al_2O_3$ is preferably used, but instead of alumina $Al_2O_3$, zirconia $ZrO_2$ may also be used.

Figure 2B:
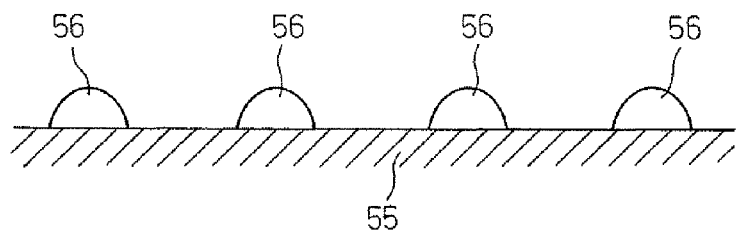

On the other hand, the catalyst carrier 55 of the second catalyst shown in FIG. 2B is comprised of zirconia $ZrO_2$. On this catalyst carrier 55, rhodium Rh 56 is carried. As will be understood from FIG. 2B, in this second catalyst, on the catalyst carrier 55, a basic layer such as shown in FIG. 2A is not carried.

Figure 3:
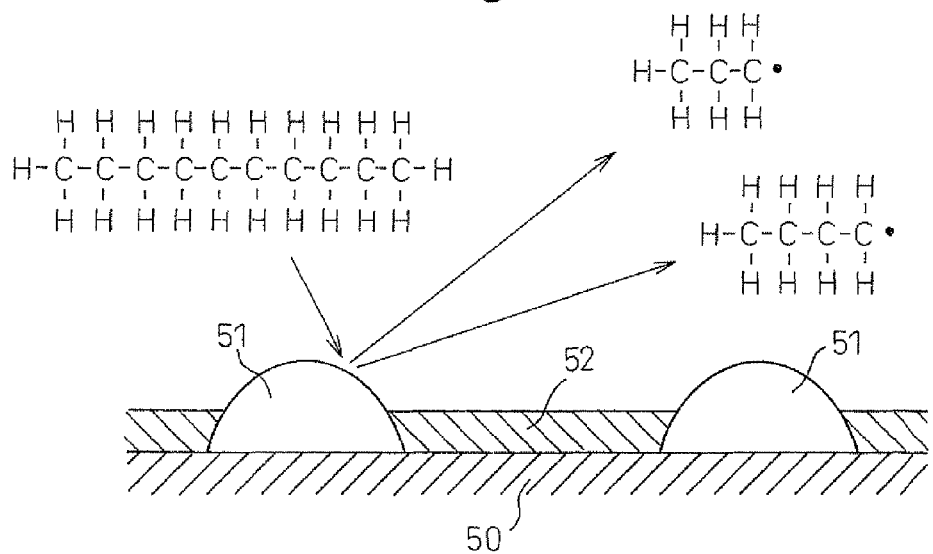
FIG. 3 is a view for explaining an oxidation reaction in an exhaust purification catalyst.

If hydrocarbons are injected from the hydrocarbon feed valve 15 into the exhaust gas, the hydrocarbons are reformed by the first catalyst. In the present invention, at this time, the reformed hydrocarbons are used to remove the $NO_x$ at the exhaust purification catalyst 13. FIG. 3 schematically shows the reforming action performed at the first catalyst at this time. As shown in FIG. 3, the hydrocarbons HC which are injected from the hydrocarbon feed valve 15 become radical hydrocarbons HC with a small carbon number due to the platinum Pt 51.

Note that, even if the fuel injector 3 injects fuel, that is, hydrocarbons, into the combustion chamber 2 in the second half of the expansion stroke or exhaust stroke, the hydrocarbons are reformed inside the combustion chamber 2 or first catalyst, and the $NO_x$ which is contained in exhaust gas is removed by the reformed hydrocarbons in the exhaust purification catalyst 13. Therefore, in the present invention, instead of feeding hydrocarbons from the hydrocarbon feed valve 15 to the inside of an engine exhaust passage, it is also possible to feed hydrocarbons into the combustion chamber 2 in the second half of the expansion stroke or exhaust stroke. In this way, in the present invention, it is possible to feed hydrocarbons into the combustion chamber 2, but below, the present invention will be explained with reference to the case of trying to inject hydrocarbons from a hydrocarbon feed valve 15 to the inside of an engine exhaust passage.

Figure 4:
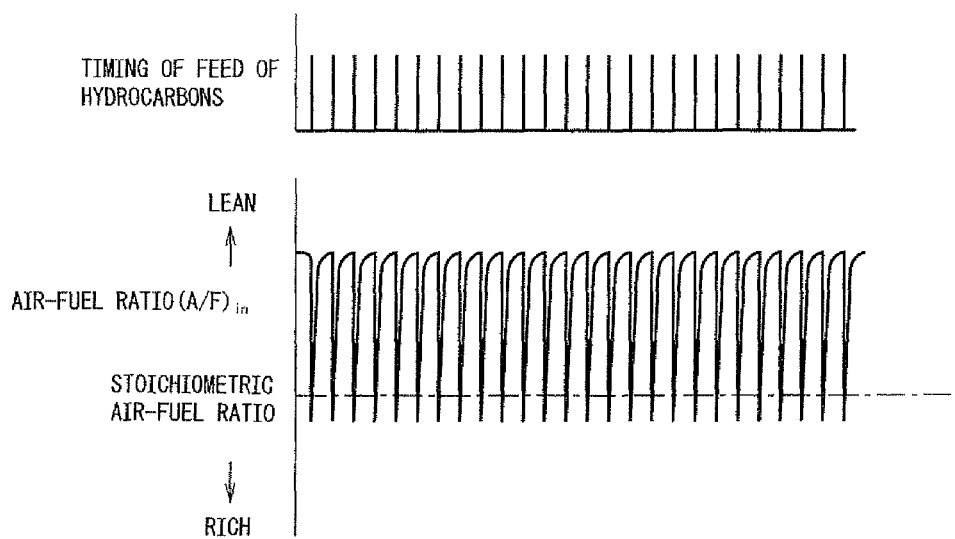
FIG. 4 is a view showing a change of an air-fuel ratio of exhaust gas flowing into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
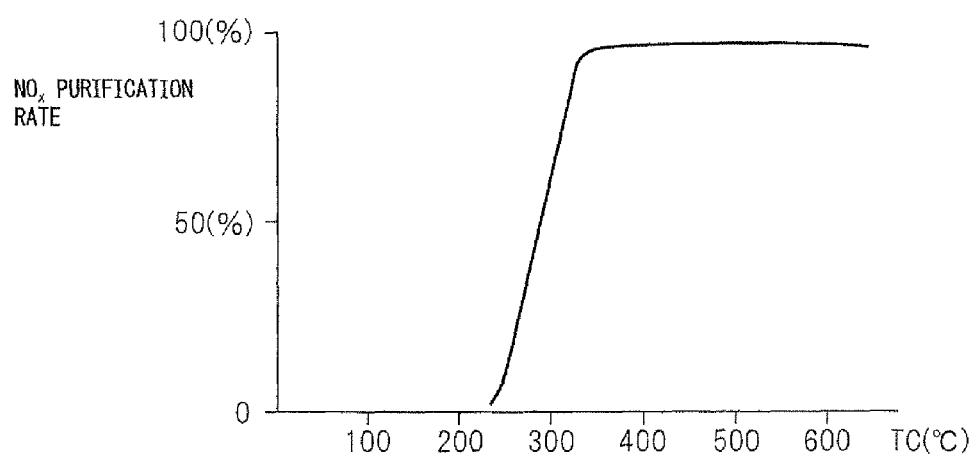
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
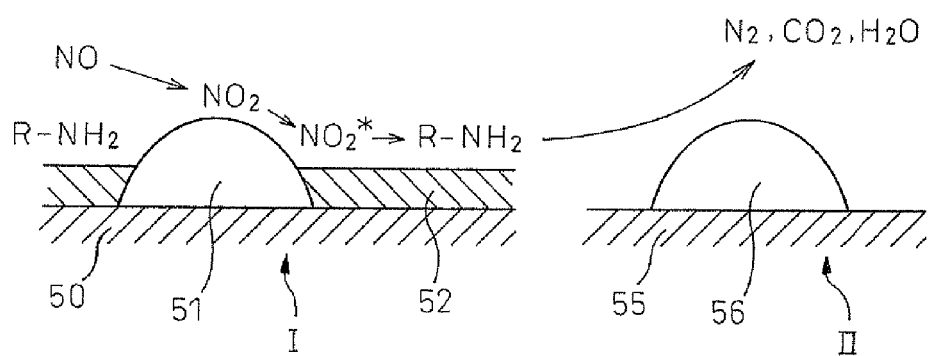
FIGS. 6A and 6B are views for explaining an oxidation reduction reaction in an exhaust purification catalyst.
Figure 6B:
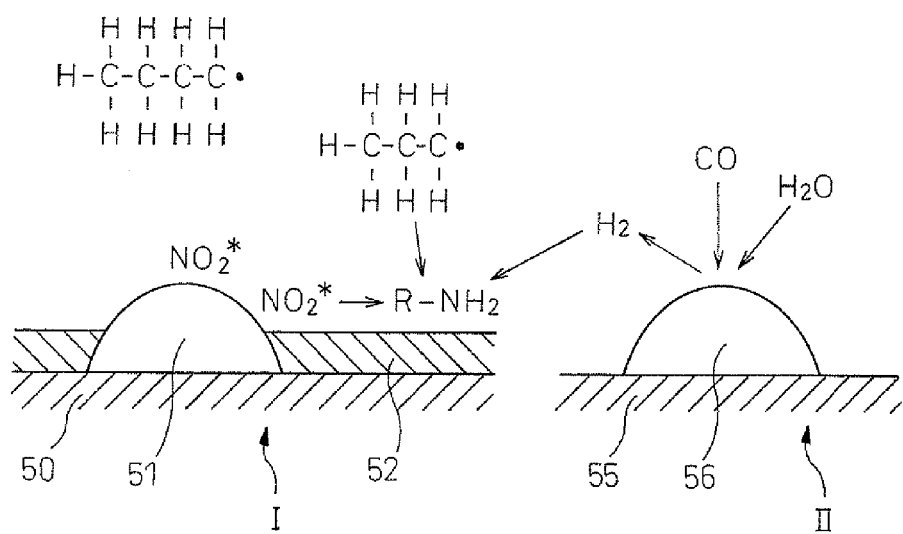

Furthermore, at this time, a large amount of reducing intermediate containing nitrogen and hydrocarbons continues to be held or adsorbed at the surface part 53 of the basic layer 52 of the first catalyst. It is learned that this reducing intermediate plays a central role in obtaining a high $NO_x$ purification rate. Next, this will be explained with reference to FIGS. 6A and 6B. Note that, these FIGS. 6A and 6B schematically show surfaces parts of the catalyst carriers 50 and 55 of the first catalyst I and second catalyst II. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6S shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2^-$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed at the first catalyst and become radicalized. As a result, as shown in FIG. 6B, the hydrocarbon concentration around the active $NO_2^*$ becomes higher. On the other hand, at this time, on the rhodium Rh 56 of the second catalyst II, as shown in FIG. 6B, hydrogen $H_2$ is produced from the carbon monoxide CO and moisture $H_2O$ contained in the exhaust gas.

In this regard, after the active $NO_2^*$ is produced, if the state of a high oxygen concentration around the active $NO_2^*$ continues for a predetermined time or more, the active $NO_2^*$ is oxidized and is absorbed in the basic layer 52 in the form of nitrate ions $NO_3^-$. However, if the hydrocarbon concentration around the active $NO_2$ is made higher before this predetermined time passes, as shown in FIG. 6B, the active $NO_2^*$ reacts on the platinum 51 with the radical hydrocarbons HC and the hydrogen $H_2$ produced on the rhodium Rh 56 of the second catalyst II, whereby a reducing intermediate $R-NH_2$ is produced. This reducing intermediate $R-NH_2$ is adhered or adsorbed on the surface of the basic layer 52.

In this way, hydrogen $H_2$ is necessary for production of the reducing intermediate $R-NH_2$. This hydrogen $H_2$, as shown in FIG. 6B, is produced by the rhodium Rh 56 from the CO and $H_2O$ which are contained in the exhaust gas. In this case, if the catalyst carrier 55 becomes stronger in basicity, the rhodium Rh 56 falls in reducing activity. As a result, hydrogen $H_2$ can no longer be produced well, therefore the reducing intermediate can no longer be produced well. Therefore, in this embodiment according to the present invention, to prevent the rhodium Rh 56 from falling in reducing activity, the catalyst carrier 55 does not carry a basic layer such as in the first catalyst I.

On the other hand, as shown in FIG. 68, if the produced reducing intermediate is surrounded by the hydrocarbons HC, the reducing intermediate $R-NH_2$ is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate $R-NH_2$ and the active $NO_2^*$ will react. At this time, the active $NO_2^*$ reacts with the reducing intermediate $R-NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. that is, the concentration of hydrocarbons flowing into the exhaust purification catalyst 13 has to be made to vibrate within a predetermined range of amplitude. Note that, in this case, a sufficient amount of reducing intermediate $R-NH_2$ has to be held on the surface part 43 of the basic layer 52 until the produced reducing intermediate reacts with the active $NO_2^*$. For this reason, the first catalyst I is provided with the basic layer 52 exhibiting basicity.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 52 in the form of nitrates without producing a reducing intermediate. To avoid this, it is necessary to make the concentration of hydrocarbons flowing into the exhaust purification catalyst 13 vibrate by within a predetermined range of period. Therefore, in this embodiment of the present invention, the vibration period of the hydrocarbon concentration is made the vibration period required for continued production of the reducing intermediate R—NH$_2$. Incidentally, in the example shown in FIG. 4, the injection interval is made 3 seconds.

Figure 7A:
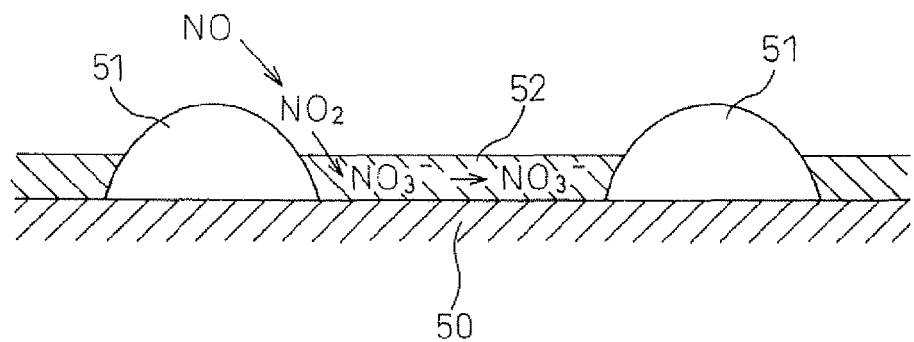
FIGS. 7A and 7B are views for explaining an oxidation reduction reaction in an exhaust purification catalyst.

If the vibration period of the hydrocarbons concentration, that is, the feed period of the hydrocarbons HC, is made longer than the above predetermined range of period, the reducing intermediate R—NH$_2$ disappears from the surface of the basic layer 52. At this time, the active NO$_2$* which is produced on the platinum Pt 51, as shown in FIG. 7A, diffuses in the basic layer 52 of the first catalyst in the form of nitrate ions NO$_3^-$ and becomes nitrates. That is, at this time, the NO$_x$ in the exhaust gas is absorbed in the form of nitrates inside of the basic layer 52 of the first catalyst.

Figure 7B:
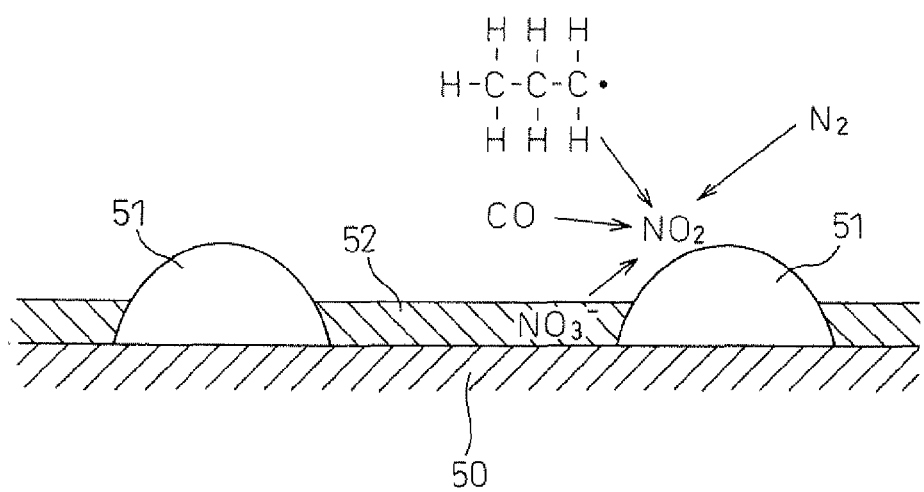

On the other hand, FIG. 7B shows the case where the air-fuel ratio of the exhaust gas which flows into the exhaust purification catalyst 13 is made the stoichiometric air-fuel ratio or rich when the NO$_x$ is absorbed in the form of nitrates inside of the basic layer 52 of the first catalyst. In this case, the oxygen concentration in the exhaust gas falls, so the reaction proceeds in the opposite direction (NO$_3^-$→NO$_2$) and consequently the nitrates absorbed in the basic layer 52 become nitrate ions NO$_3^-$ one by one and, as shown in FIG. 7B, are released from the basic layer 52 in the form of NO$_2$. Next, the released NO$_2$ is reduced by the hydrocarbons HC and CO contained in the exhaust gas.

Figure 8:
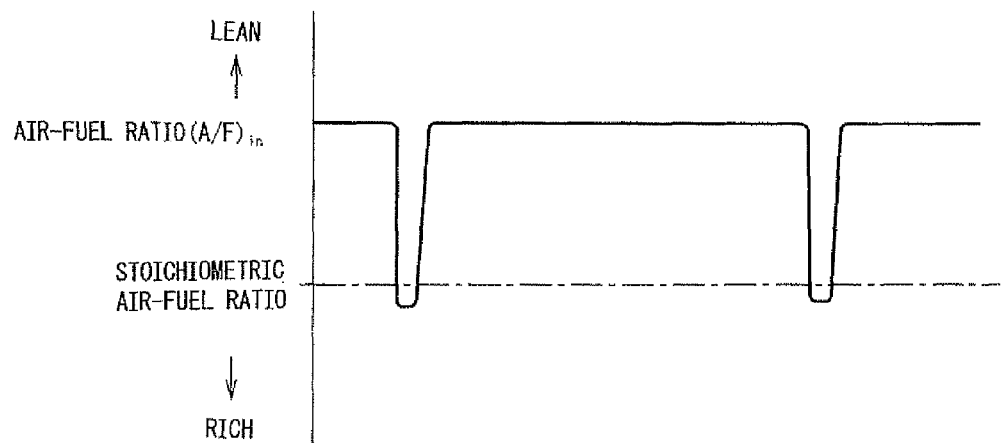
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the NO$_x$ absorption ability of the basic layer 52 of the first catalyst becomes saturated. Note that, in the example shown in FIG. 8, the time interval of this rich control is 1 minute or more. In this case, the NO$_x$ which was absorbed in the basic layer 52 when the air-fuel ratio (A/F)in of the exhaust gas was lean is released all at once from the basic layer 52 and reduced when the air-fuel ratio (A/F)in of the exhaust gas is made temporarily rich. Therefore, in this case, the basic layer 52 plays the role of an absorbent for temporarily absorbing NO$_x$.

Note that, at this time, sometimes the basic layer 52 temporarily adsorbs the NO$_x$. Therefore, if using term of storage as a term including both absorption and adsorption, at this time, the basic layer 52 performs the role of an NO$_x$ storage agent for temporarily storing the NO$_x$. That is, in this case, if the ratio of the air and fuel (hydrocarbons) which are fed into the engine intake passage, combustion chambers 2, and exhaust passage upstream of the exhaust purification catalyst 13 is called the air-fuel ratio of the exhaust gas, the exhaust purification catalyst 13 functions as an NO$_x$ storage catalyst which stores the NO$_x$ when the air-fuel ratio of the exhaust gas is lean and releases the stored NO$_x$ when the oxygen concentration in the exhaust gas falls.

Figure 9:
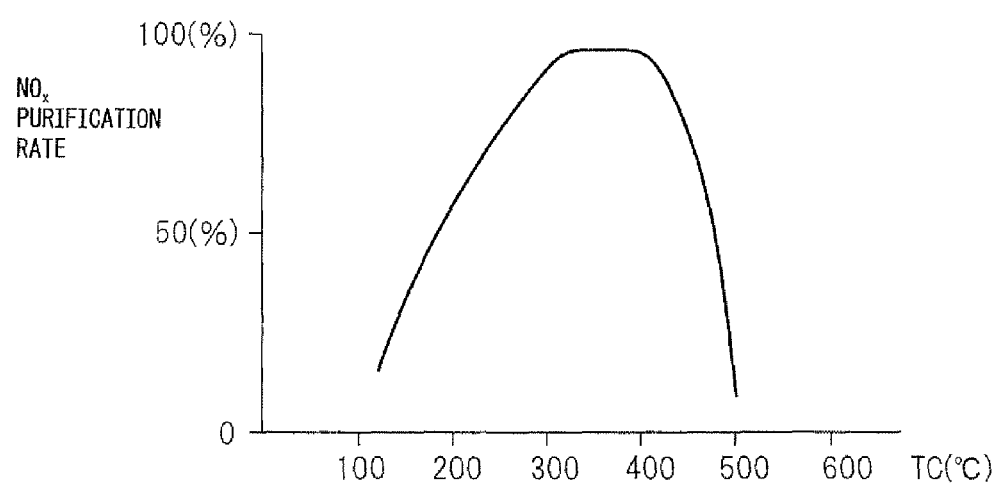
FIG. 9 is a view of an $NO_x$ purification rate.

FIG. 9 shows the NO$_x$ purification rate when making the exhaust purification catalyst 13 function as an NO$_x$ storage catalyst in this way. Note that, the abscissa of the FIG. 9 shows the catalyst temperature TC of the exhaust purification catalyst 13. When making the exhaust purification catalyst 13 function as an NO$_x$ storage catalyst, as shown in FIG. 9, when the catalyst temperature TC is 300° C. to 400° C., an extremely high NO$_x$ purification rate is obtained, but when the catalyst temperature TC becomes a 400° C. or higher high temperature, the NO$_x$ purification rate falls.

In this way, when the catalyst temperature TC becomes 400° C. or more, the NO$_x$ purification rate falls because if the catalyst temperature TC becomes 400° C. or more, the nitrates break down by heat and are released in the form of NO$_2$ from the first catalyst. That is, so long as storing NO$_x$ in the form of nitrates, when the catalyst temperature TC is high, it is difficult to obtain a high NO$_x$ purification rate. However, in the new NO$_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high NO$_x$ purification rate is obtained.

Therefore, in the present invention, an exhaust purification catalyst 13 for reacting NO$_x$ contained in exhaust gas and reformed hydrocarbons is arranged inside of an engine exhaust passage, the exhaust purification catalyst 13 is comprised of a mixture of a first catalyst in which platinum Pt 51 and a basic layer 52 are carried on a carrier 50 and a second catalyst in which rhodium Rh 56 is carried on zirconia 55, the exhaust purification catalyst 13 has the property of reducing the NO$_x$ which is contained in exhaust gas if the concentration of hydrocarbons flowing into the exhaust purification catalyst 13 is made to vibrate within a predetermined range of amplitude and within a predetermined range of period and has the property of being increased in storage amount of NO$_x$ which is contained in exhaust gas if the vibration period of the hydrocarbon concentration is made longer than the predetermined range, and, at the time of engine operation, the concentration of hydrocarbons flowing into the exhaust purification catalyst 13 is made to vibrate within the predetermined range of amplitude and within the predetermined range of period to thereby reduce NO$_x$ which is contained in exhaust gas in the exhaust purification catalyst 13.

That is, the NO$_x$ purification method which is shown from FIG. 4 to FIGS. 6A and 6B can be said to be a new NO$_x$ purification method designed to remove NO$_x$ without forming almost any nitrates in the case of using an exhaust purification catalyst which carries a precious metal catalyst and forms a basic layer which can absorb NO$_x$. In actuality, when using this new NO$_x$ purification method, the nitrates which are detected from the basic layer 52 become much smaller in amount compared with the case where making the exhaust purification catalyst 13 function as an NO$_x$ storage catalyst. Note that, this new NO$_x$ purification method will be referred to below as the first NO$_x$ purification method.

Next, referring to FIG. 10 to FIG. 15, this first NO$_x$ purification method will be explained in a bit more detail.

Figure 10:
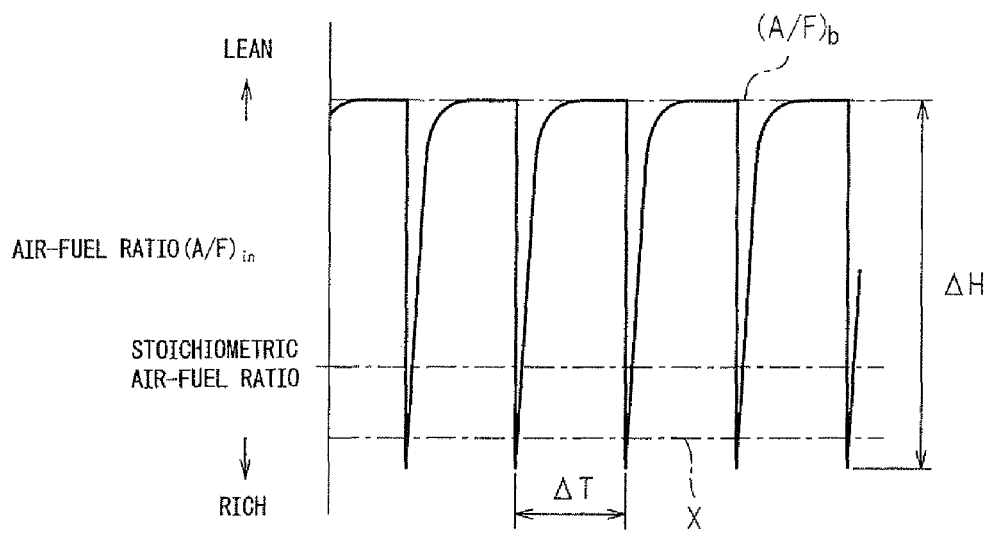
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F) shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active NO$_2$* being stored in the form of nitrates inside the basic layer 52. To make the active NO$_2$* and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active NO$_2$* and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2^*$, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal Pt 51 and becomes stronger in oxidizing strength if strengthening the acidity. Therefore, the oxidizing strength of the exhaust purification catalyst 13 changes due to the carried amount of the precious metal Pt 51 or the strength of the acidity.

Figure 11:
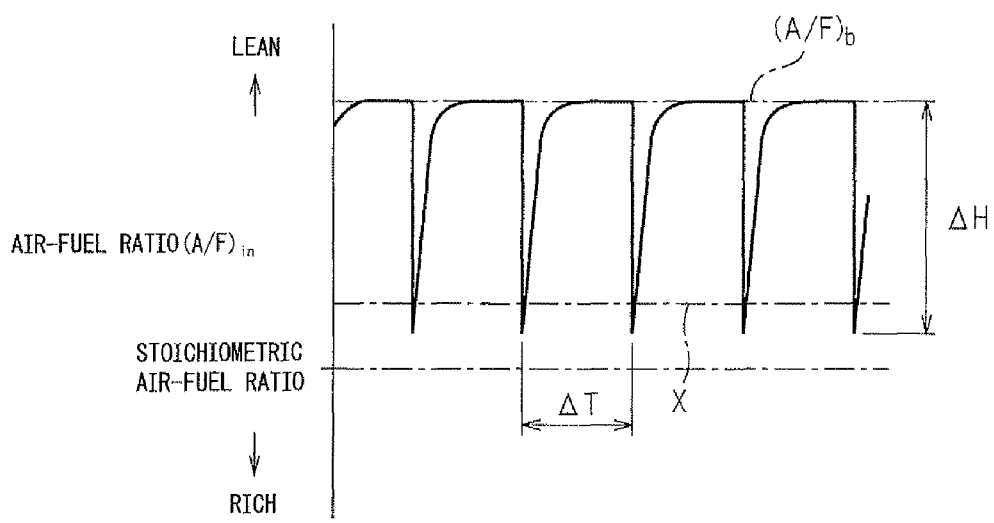
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
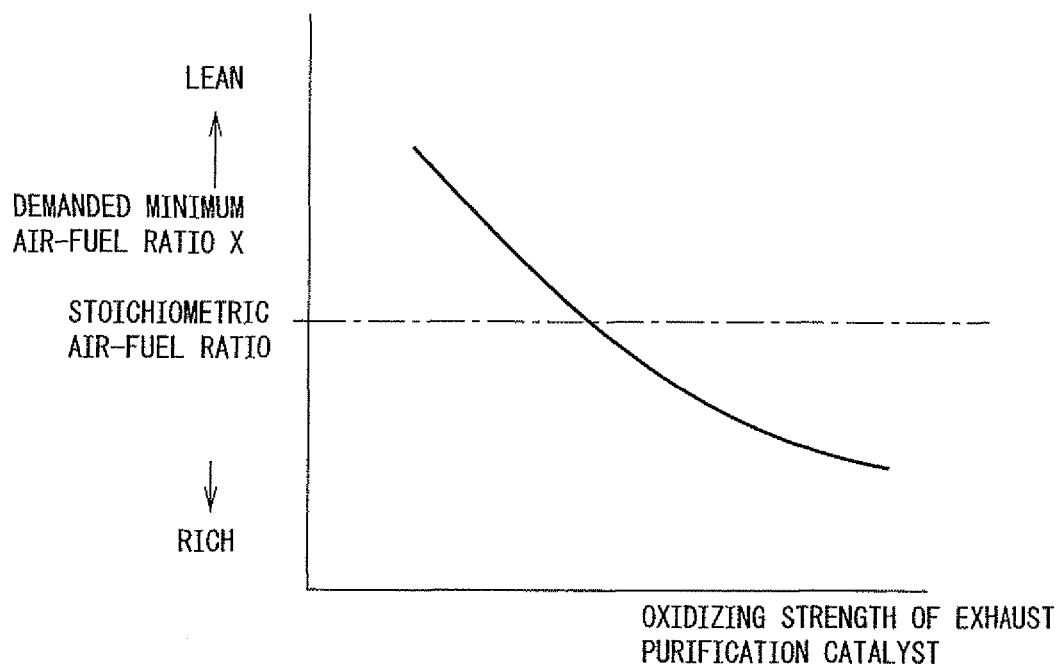
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
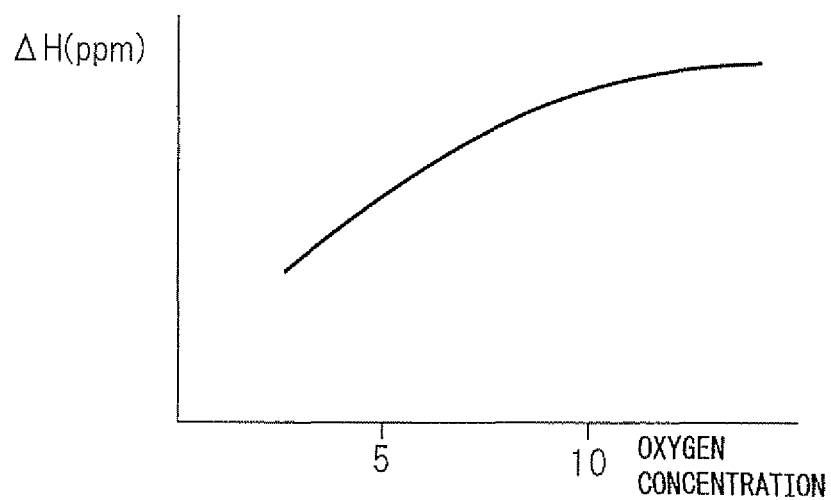
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. From FIG. 13, it is learned that, to obtain the same $NO_x$ purification rate the higher the oxygen concentration in the exhaust gas before the hydrocarbons are fed, the greater the amplitude $\Delta H$ of the hydrocarbon concentration has to be made. That is, to obtain the same $NO_x$ purification rate, the higher the base air-fuel ratio (A/F)b, the greater the amplitude $\Delta T$ of the hydrocarbon concentration has to be made. In other words, to remove the $NO_x$ well, the lower the base air-fuel ratio (A/F)b, the more the amplitude $\Delta T$ of the hydrocarbon concentration can be reduced.

Figure 14:
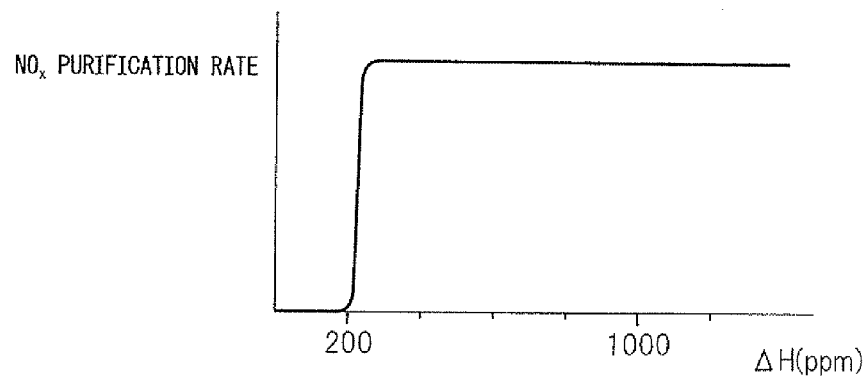
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_x$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
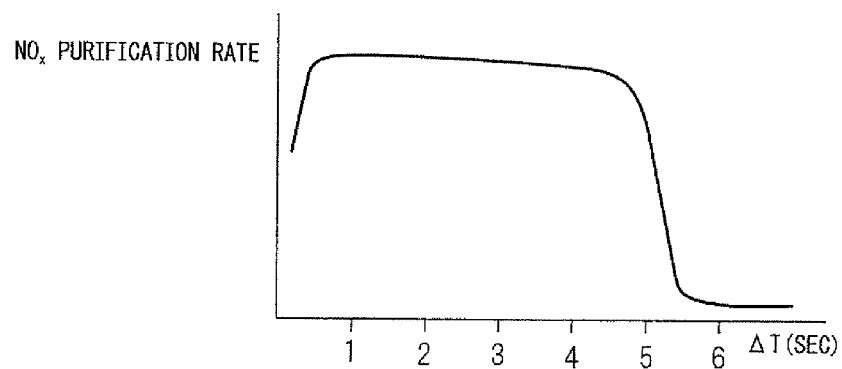
FIG. 15 is a view showing a relationship of a vibration period ΔT of a hydrocarbon concentration and an $NO_x$ purification rate.

Further, if the vibration period $\Delta T$ of the hydrocarbon concentration becomes longer, the oxygen concentration around the active $NO_2$ becomes higher in the time after the hydrocarbons are fed to when the hydrocarbons are next fed. In this case, if the vibration period $\Delta T$ of the hydrocarbon concentration becomes longer than about 5 seconds, the active $NO_2^*$ starts to be absorbed in the form of nitrates inside the basic layer 52. Therefore, as shown in FIG. 15, if the vibration period $\Delta T$ of the hydrocarbon concentration becomes longer than about 5 seconds, the $NO_x$ purification rate falls. Therefore, the vibration period $\Delta T$ of the hydrocarbon concentration has to be made 5 seconds or less.

On the other hand, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
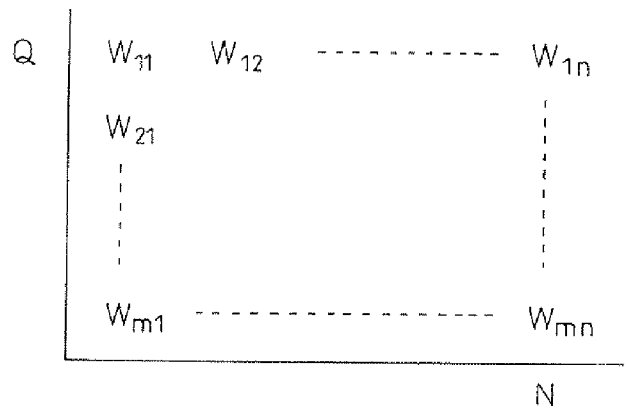
FIG. 16 is a view showing a map of the hydrocarbon feed amount W.

Now, in the present invention, the hydrocarbon feed amount and injection timing from the hydrocarbon feed valve 15 are made to change so as to control the amplitude ΔH and vibration period ΔT of the hydrocarbons concentration to become the optimum values in accordance with the engine operating state. In this case, in this embodiment of the present invention, the hydrocarbon feed amount W able to give the optimum amplitude ΔH of the hydrocarbon concentration is stored as a function of the injection amount Q from the fuel injector 3 and engine speed N in the form of a map such as shown in FIG. 16 in advance in the ROM 32. Further, the optimum vibration amplitude ΔT of the hydrocarbon concentration, that is, the injection period ΔT of the hydrocarbons is similarly stored as a function of the injection amount Q and engine speed N in the form of a map in advance in the ROM 32.

Next, referring to FIG. 17 to FIG. 20, an $NO_x$ purification method in the case when making the exhaust purification catalyst 13 function as an $NO_x$ storage catalyst will be explained in detail. The $NO_x$ purification method in the case when making the exhaust purification catalyst 13 function as an $NO_x$ storage catalyst in this way will be referred to below as the second $NO_x$ purification method.

Figure 17:
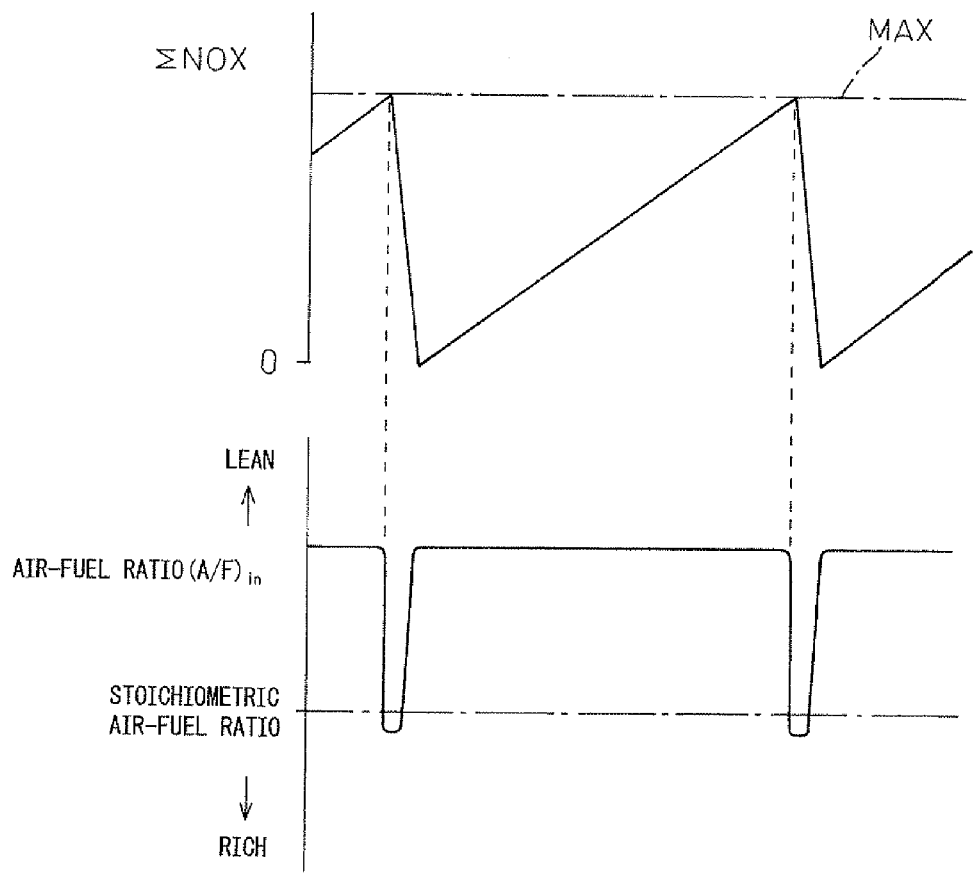
FIG. 17 is a view showing a change in the air-fuel ratio of the exhaust gas flowing to the exhaust purification catalyst etc.

In this second $NO_x$ purification method, as shown in FIG. 17, when the stored $NO_x$ amount ΣNOX which is stored in the basic layer 52 exceeds a predetermined allowable amount MAX, the air-fuel ratio (A/F)in of the exhaust gas which flows into the exhaust purification catalyst 13 is temporarily made rich. If the air-fuel ratio (A/F)in of the exhaust gas is made rich, the $NO_x$ which was absorbed at the basic layer 52 when the air-fuel ratio (A/F)in of the exhaust gas was lean is released all at once from the basic layer 52 and reduced. Due to this, the $NO_x$ is removed.

Figure 18:
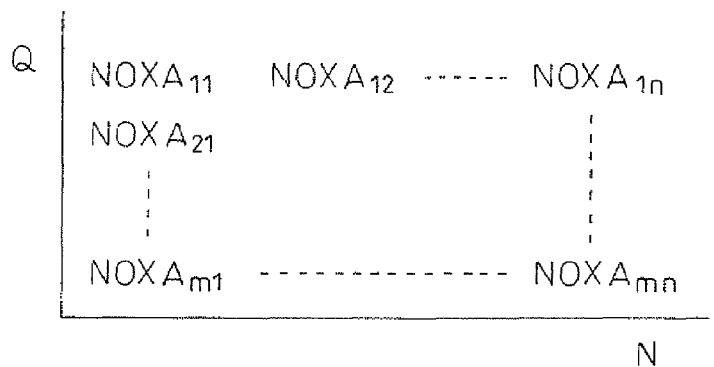
FIG. 18 is a view showing a map of an exhausted $NO_x$ amount NOXA.

The stored $NO_x$ amount ΣNOX is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 18 in advance in the ROM 32. The stored $NO_x$ amount ΣNOX is calculated from exhausted $NO_x$ amount NOXA. In this case, as explained before, the period during which the air-fuel ratio (A/F)in of the exhaust gas is made rich is usually 1 minute or more.

Figure 19:
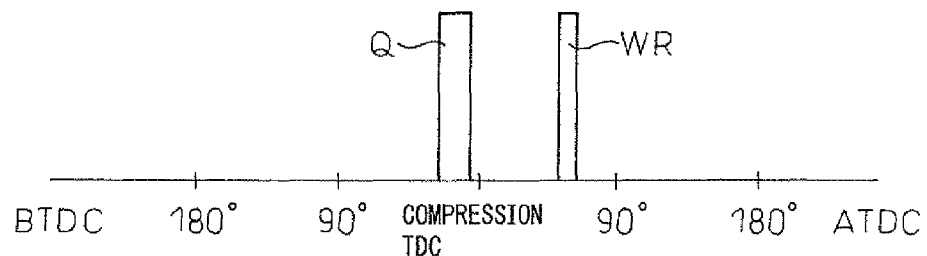
FIG. 19 is a view showing a fuel injection timing.
Figure 20:
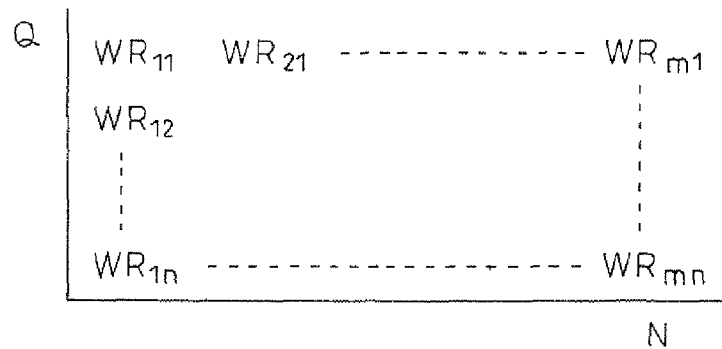
FIG. 20 is a view showing a map of a hydrocarbon feed amount WR.

In this second $NO_x$ purification method, as shown in FIG. 19, the fuel injector 3 injects additional fuel WR into the combustion chamber 2, in addition to the combustion-use fuel Q so that the air-fuel ratio (A/F)in of the exhaust gas flowing into the exhaust purification catalyst 13 is made rich. Note that, in FIG. 19, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 20 in advance in the ROM 32. Of course, in this case, it is also possible to make the amount of feed of hydrocarbons from the hydrocarbon feed valve 15 increase so as to make the air-fuel ratio (A/F)in of the exhaust gas rich.

In this regard, to use the first $NO_x$ purification method to remove $NO_x$, even when the $NO_x$ concentration in the exhaust gas is low, at least a certain amount of hydrocarbons has to be fed in a short period. Therefore, when the $NO_x$ concentration of the exhaust gas is low, the $NO_x$ purification efficiency becomes poor. As opposed to this, in the second $NO_x$ purification method, when the $NO_x$ concentration in the exhaust gas is low, the time until the stored $NO_x$ amount ΣNOX reaches the allowable value MAX becomes longer, so the period for making the air-fuel ratio (A/F)in of the exhaust gas rich just becomes longer, and accordingly, the $NO_x$ purification efficiency does not particularly become worse. Therefore, when the $NO_x$ concentration in the exhaust gas is low, use of the second $NO_x$ purification method rather than the first $NO_x$ purification method can be said to be preferable. That is, which of the first $NO_x$ purification method and second $NO_x$ purification method should be used changes in the engine operating state.

Figure 21:
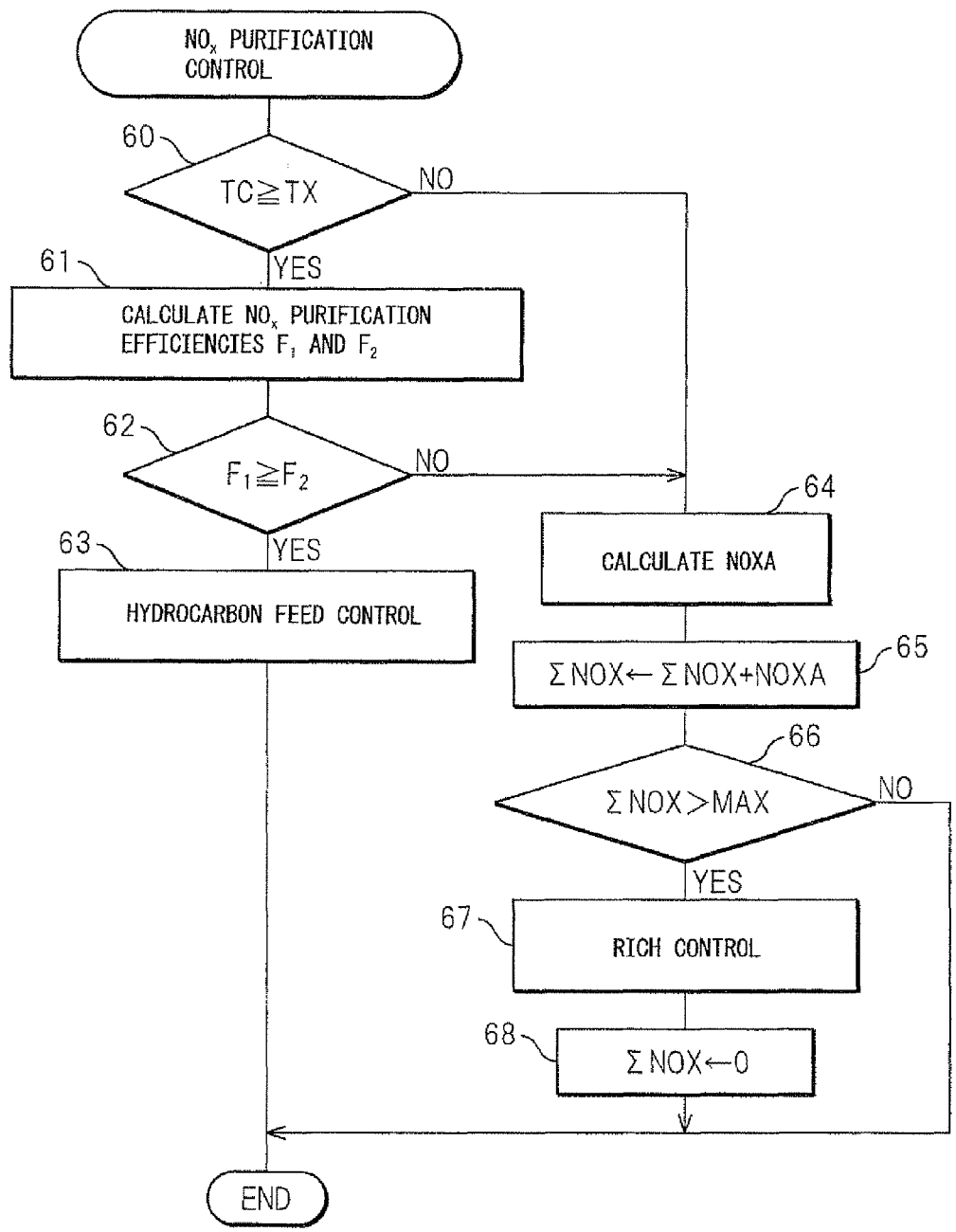
FIG. 21 is a flow chart for $NO_x$ purification control.

FIG. 21 shows the $NO_x$ purification control routine. This routine is executed by interruption every predetermined time.

Referring to FIG. 21, first, at step 60, it is judged from the output signal of the temperature sensor 23 if the temperature TC of the exhaust purification catalyst 13 exceeds the activation temperature TX. When TC≥TX, that is, when the exhaust purification catalyst 13 is activated, the routine proceeds to step 61 where the $NO_x$ purification efficiency $F_1$ when using the first $NO_x$ purification method and the $NO_x$ purification efficiency $F_2$ when using the second $NO_x$ purification method are calculated. The $NO_x$ purification efficiencies $F_1$ and $F_2$ express the amounts of consumption of fuel or hydrocarbons per unit time required for obtaining a unit $NO_x$ purification rate. In this case, the $NO_x$ purification efficiency $F_1$ is calculated from the hydrocarbon feed amount W which is calculated from the map of FIG. 16, the hydrocarbon injection intervals, and the $NO_x$ purification rate shown in FIG. 5, while the $NO_x$ purification efficiency $F_2$ is calculated from the additional fuel amount WR which is calculated from the map of FIG. 20, the interval between timings when the air-fuel ratio is made rich in FIG. 17, and the $NO_x$ purification rate shown in FIG. 9.

Next, at step 62, it is judged if the $NO_x$ purification efficiency $F_1$ is higher than the $NO_x$ purification efficiency $F_2$. When $F_2 \geq F_2$, it is judged that the first $NO_x$ purification method should be used. At this time, the routine proceeds to step 63. At step 63, the feed control of hydrocarbons from the hydrocarbon feed valve 15 is performed. At this time, the $NO_x$ purification action by the first $NO_x$ purification method is performed.

As opposed to this, when it is judged at step 60 that TC<TX or when it is judged at step 62 that $F_1 < F_2$, it is judged that the second $NO_x$ purification method should be used and the routine proceeds to step 64. At step 64, the $NO_x$ amount NOXA of $NO_x$ exhausted per unit time is calculated from the map shown in FIG. 18. Next, at step 65, ΣNOX is incremented by the exhausted $NO_x$ amount NOXA to calculate the stored $NO_x$ amount ΣNOX. Next, at step 66, it is judged if the stored $NO_x$ amount ΣNOX exceeds the allowable value MAX. When ΣNOX>MAX, the routine proceeds to step 67 where the additional fuel amount WR is calculated from the map shown in FIG. 20, then the action of injection of the additional fuel is performed. Next, at step 68, ΣNOX is cleared.

Note that the radicalization action of hydrocarbons shown in FIG. 3 is not performed unless the exhaust purification catalyst 13 is activated. Therefore, the first $NO_x$ purification method cannot be used unless the exhaust purification catalyst 13 is activated. As opposed to this, the second $NO_x$ purification method is not necessarily high in purification efficiency, but can be used even when the temperature TC of the exhaust purification catalyst 13 is low. Therefore, in the routine shown in FIG. 21, when it is judged at step 60 that TC<TX, the routine proceeds to step 64 where the $NO_x$ purification action by the second $NO_x$ purification method is performed.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, the exhaust purification system comprising:
   an exhaust purification catalyst for reacting $NO_x$ contained in exhaust gas and reformed hydrocarbons arranged inside of an engine exhaust passage, wherein
      the exhaust purification catalyst comprises a mixture of a first catalyst in which platinum and a basic layer are carried on a carrier and a second catalyst in which rhodium is carried on zirconia, and
   an electronic control unit, wherein the electronic control unit is configured to control a vibration of a concentration of hydrocarbons flowing into the exhaust purification catalyst within a predetermined range of amplitude and within a predetermined range of period, and is configured to control the vibration period of the hydrocarbon concentration longer than the predetermined range of period, wherein
      when the electronic control unit controls the vibration of the concentration of hydrocarbons flowing into the exhaust purification catalyst within the predetermined range of amplitude and within the predetermined range of period, the exhaust purification catalyst has a property of chemically reducing the $NO_x$ that is contained in exhaust gas without storing, or storing a fine amount of nitrates in the exhaust purification catalyst, and
      when the electronic control unit controls the vibration period of the hydrocarbon concentration longer than the predetermined range of period, the exhaust purification catalyst has a property of being increased in storage amount of $NO_x$ that is contained in exhaust gas.

2. The exhaust purification system of an internal combustion engine as claimed in claim 1, wherein the basic layer of the first catalyst includes at least one of an alkali metal, an alkali earth metal, a rare earth, or a metal that can donate electrons to $NO_x$.

3. The exhaust purification system of an internal combustion engine as claimed in claim 2, wherein the zirconia of the second catalyst does not carry a basic layer.

4. The exhaust purification system of an internal combustion engine as claimed in claim 1, wherein the carrier of the first catalyst is comprises alumina.

5. The exhaust purification system of an internal combustion engine as claimed in claim 1, wherein the carrier of the first catalyst carries palladium in addition to platinum.

6. The exhaust purification system of an internal combustion engine as claimed in claim 1, wherein inside the exhaust purification catalyst, $NO_x$ contained in exhaust gas and reformed hydrocarbons react so as to form a reducing intermediate containing nitrogen and hydrocarbons, and the vibration period of the hydrocarbon concentration is the vibration period required for continued production of the reducing intermediate.

7. The exhaust purification system of an internal combustion engine as claimed in claim 6, wherein the vibration period of the hydrocarbon concentration is 0.3 second to 5 seconds.

\* \* \* \* \*